(12) United States Patent
Moore et al.

(10) Patent No.: US 9,542,404 B2
(45) Date of Patent: Jan. 10, 2017

(54) SUBPARTITIONING OF A NAMESPACE REGION

(71) Applicant: NETAPP, INC., Sunnyvale, CA (US)

(72) Inventors: Joseph Moore, Wichita, KS (US); Ziling Huang, Lincoln, NE (US)

(73) Assignee: NetApp, Inc., Sunnyvale, CA (US)

( * ) Notice: Subject to any disclaimer, the term of this patent is extended or adjusted under 35 U.S.C. 154(b) by 219 days.

(21) Appl. No.: 14/181,819

(22) Filed: Feb. 17, 2014

(65) Prior Publication Data

US 2015/0234845 A1 Aug. 20, 2015

(51) Int. Cl.
*G06F 17/30* (2006.01)

(52) U.S. Cl.
CPC ....... *G06F 17/30094* (2013.01); *G06F 17/302* (2013.01); *G06F 17/30097* (2013.01)

(58) Field of Classification Search
None
See application file for complete search history.

(56) References Cited

U.S. PATENT DOCUMENTS

| | | | | |
|---|---|---|---|---|
| 2003/0033308 A1* | 2/2003 | Patel | ................... | G06F 11/1076 |
| 2009/0271412 A1* | 10/2009 | Lacapra | ............ | G06F 17/30206 |
| 2010/0262585 A1* | 10/2010 | Rosikiewicz | ..... | G06F 17/30067 707/679 |
| 2011/0145195 A1* | 6/2011 | Passey | ................ | G06F 11/2094 707/638 |
| 2013/0124912 A1* | 5/2013 | Griffith | ................... | G06F 11/20 714/4.2 |
| 2013/0151492 A1* | 6/2013 | Kirihata | ............ | G06F 17/30097 707/696 |
| 2015/0120928 A1* | 4/2015 | Gummaraju | ........ | H04L 67/1008 709/226 |

OTHER PUBLICATIONS

Co-pending U.S. Appl. No. 14/181,811 of Moore et al., filed Feb. 17, 2014.

* cited by examiner

*Primary Examiner* — Anh Tai Tran
(74) *Attorney, Agent, or Firm* — Haynes and Boone LLP

(57) ABSTRACT

Technology is disclosed for subpartitioning a namespace region. In various embodiments, the technology creates at least two subpartitions from a partitioned namespace, wherein the partitioned namespace corresponds to at least two different name nodes of the large scale data storage service; and stores data corresponding to each subpartition as a separate file, e.g., so that it can be easily mounted by an operating system executed by a different computing device.

20 Claims, 16 Drawing Sheets

| hash value range | | name node | ... |
| --- | --- | --- | --- |
| start | end | | |
| 0000 | 3FFF | 192.168.0.1 | ... |
| 4000 | 7FFF | 192.168.0.2 | ... |
| 8000 | BFFF | 192.168.0.3 | ... |
| C000 | FFFF | 192.168.0.4 | ... |

*FIG. 8*

SUBPARTITIONING OF A NAMESPACE REGION

BACKGROUND

It is now generally thought that the amount of data that is stored annually in a year is equal to all of the combined data stored in all previous years. To make sense of some types of data, companies rely on more than just traditional storage and relational database solutions.

One class of large scale data storage ("LSDS") applications that some companies rely on to store and analyze voluminous data is termed "NoSQL," and a specific example application is Hadoop, which is an open-source software for storing and analyzing a large volume of data on clusters of computing devices.

LSDS applications can include a multi-node cluster of computing devices that together operate a storage or file system layer. For example, Hadoop has a Hadoop Distributed File system ("HDFS") layer. HDFS stores large files across the clusters of multiple computing devices ("nodes"). To coordinate data storage, HDFS relies on a "primary name node." The primary name node stores a file system index and other metadata that enables client computing devices to identify one or more data nodes that store data. For example, when a client computing device stores data, it requests a storage area from the primary name node. The primary name node identifies a data node and the client computing device then provides the data to be stored to the identified data node. When a client computing device reads data, it transmits an identifier to the primary name node (e.g., a uniform resource locator) and in response, the primary name node identifies one or more data nodes that store the requested data. The requesting client computing device then requests the data from the identified data nodes.

Thus, the primary name node serves as a single point of failure for the entire HDFS. Moreover, the primary name node can become a bottleneck when it services large quantities of data storage requests, e.g., because it is a single server and usually stores the index and/or other metadata only in memory.

BRIEF DESCRIPTION OF THE DRAWINGS

FIG. 8 is a table diagram illustrating a partition table, consistent with various embodiments.

DETAILED DESCRIPTION

Figure 1:
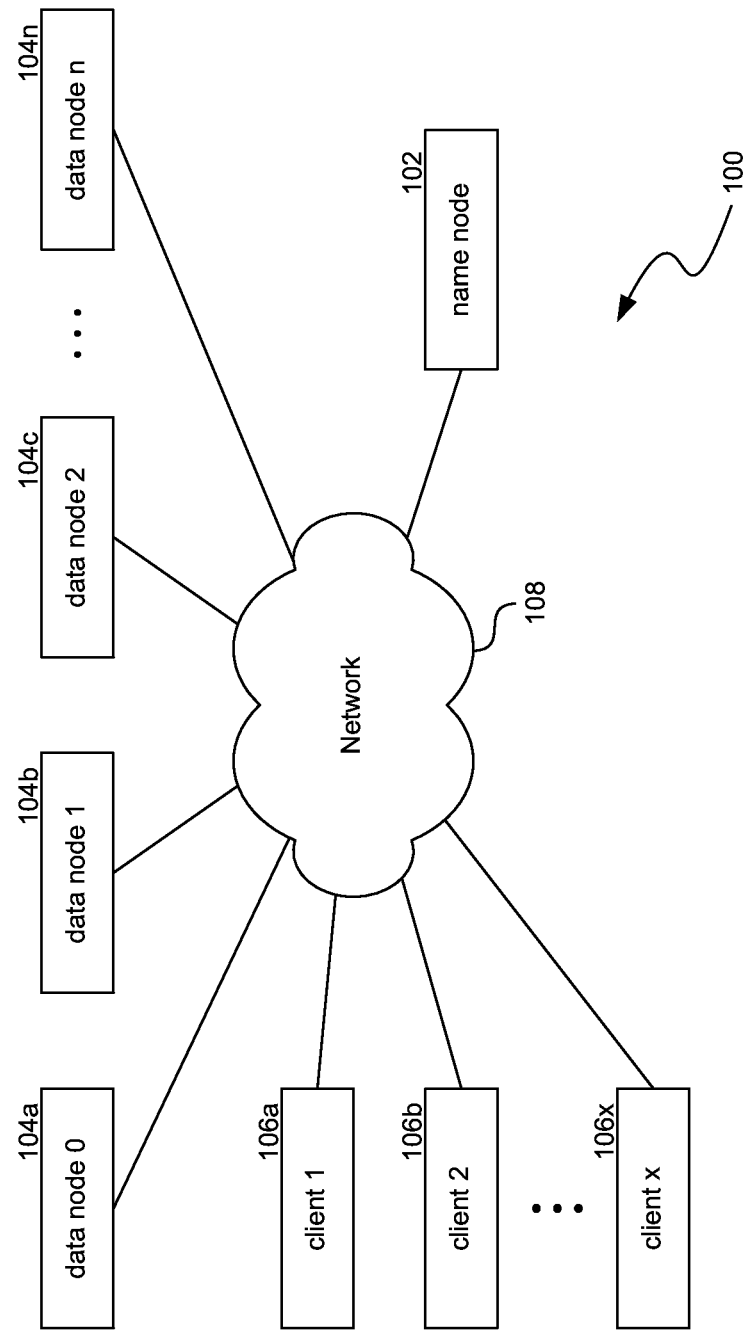
FIG. 1 is a block diagram illustrating an environment in which a large scale data storage service may operate in some embodiments.

Technology is disclosed for partitioning a name node namespace of large scale data storage ("LSDS") service, e.g., by using a hashing function on file paths and dividing the namespace according to ranges of hashed values ("the technology"). A namespace identifies a set of possible values. In various embodiments, the technology implements multiple name nodes, wherein each name node stores indexes and/or other metadata for a portion of the namespace assigned to it. As an example, if file paths are hashed to 32-bit values, the namespace ranges from 0000 to FFFF in hexadecimal notation. If four name nodes operate in an environment, each name node may be assigned one fourth of the total namespace, e.g., 0000-3FFF, 4000-7FFF, 8000-BFFF, and C000-FFFF. A master name node handles assignment and distribution of the namespace by creating and distributing a namespace partition table ("partition table"). The partition table indicates the namespace distribution, e.g., by associating hash value ranges with name nodes. Name nodes may be identified by a network identifier, e.g., a server name, Internet Protocol ("IP") address, etc. The master name node may respond at a "well-known" server name, IP address, port number, etc. If the master name node is no longer operating, e.g., because it has crashed, one of the other name nodes may take over, e.g., after a voting process, priority queue information, etc. When a client computing device needs to write data or read data, the client computing device can first receive the partition table; hash the file path (or folder path, also referred to herein as "file path") for the location corresponding to the file or folder to be written or read; identify from the received partition table which name node to transmit a file request to; and transmit the file request to the identified name node. In various embodiments, identification and/or transmission of the file requests occurs at a protocol layer (e.g., a protocol layer employed by the LSDS service).

LSDS services can employ name nodes and data nodes. A name node receives file requests and identifies data nodes that can satisfy the file requests. In various embodiments, name nodes and/or data nodes store associations between block numbers (e.g., identifiers for locations where data is stored) and hash values. As an example, block numbers may be encoded with hash values. In some embodiments, name nodes may store associations between file paths, data nodes, and block identifiers. As an example, to satisfy a file request, a name node may determine which data nodes store blocks corresponding to the requested file and identify the data nodes to the client computing device that transmitted the request. Alternatively, the name node may service file requests by intermediating requests between client computing devices and data nodes, thereby eliminating communications directly between client computing devices and data nodes. As an example, client computing devices may transmit requests to name nodes associated with the file paths (as identified by a correspondence between a hash value of the file paths in the partition table), and the name nodes may service file requests (e.g., to write or read data) by forwarding such requests to data nodes, and data from data nodes to the client computing devices that transmitted the requests.

In some embodiments, the namespace assigned to name nodes may be further partitioned into multiple subpartitions (also referred to as "buckets"). Each subpartition may be stored as a separate file system (e.g., HDFS file), e.g., at a redundant shared storage system. As an example, the namespace assigned to each of four name nodes may be further divided into eight subpartitions, thereby creating a total of 32 subpartitions. Each subpartition (or a subset of the subpartitions) may be stored on storage systems available via a network to all of the name nodes (e.g., because they are stored on storage systems commercialized by NetApp, Inc.). If one of the name nodes is no longer available to service requests from client computing devices, e.g., because of crashing, overloading, or other issues, the other name servers subsume the subpartitions previously handled by the name node that is no longer available. As an example, suppose name node 0 ("master name node") originally handled subpartitions 0-7, name node 1 originally handled subpartitions 8-15, name node 2 originally handled subpartitions 16-23, and name node 3 originally handled subpartitions 24-31; and then name node 1 becomes unavailable. Then, the master name node (name node 0) could redistribute subpartitions 8-15 across itself and name node 2 and name node 3, e.g., so that name node 0 subsequently handles subpartitions 0-10, name node 2 subsequently handles subpartitions 11-21, and name node 3 subsequently handles subpartitions 22-31. The technology can easily facilitate this redistribution by simply causing the respective name nodes to mount additional file systems. Thus, the technology is capable of load balancing database partitions "on the fly" without having to redistribute data across storage systems, servers, etc. As is known in the art, mounting a file system is accomplished by invoking various commands or application program interfaces (APIs) provided by underlying operating systems. As an example, the LINUX operating system provides a "mount" command to mount file systems. Name nodes can determine that a name node has become unavailable by detecting that no inter-name node "heartbeat" message has been received, e.g., during a specified time period. If a name node that previously handled a subpartition is no longer available, then the technology can assign the subpartition to a different name node. The subpartitioning can optimize load-balancing for situations not involving failover for failed name nodes. Without sub partitioning, one of the surviving name nodes would assume double the workload of the remaining surviving name nodes (e.g., one surviving node takes over the entire failed partition). Additionally, even in non-failure scenarios, subpartitioning can provide load-balancing benefit. Although the hash-based partition can ensure that the namespace (e.g., pathnames) are equally divided between the name nodes (e.g., partitions), the size of the managed data can be dominated by the total number of data blocks for the files in the partitions. With subpartitioning, the overall load can be balanced, e.g., by skewing the partitions of the name space assigned to various partitions/ name nodes to achieve an overall balance of data managed between the various name nodes. For example, one of the name nodes (e.g., the primary name node) can have a smaller partition than other name nodes by assignment of fewer or smaller subpartitions. In various embodiments, the technology stores the files that are capable of being mounted in a redundant, highly available manner, e.g., at storage servers. As an example, NetApp, Inc. commercializes storage servers that provide multiple levels of redundancy such that even when some components fail, other components can still satisfy storage requests (e.g., to write data or read previously stored data).

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating an environment 100 in which a large scale data storage service may operate. The environment 100 can include a name node 102, multiple data nodes 104, and multiple client nodes 106. In the illustrated example, there are data node 0 (104*a*), data node 1 (104*b*), data node 2 (104*c*), and data node n (104*n*); and client 1 (106*a*), client 2 (106*b*), and client x (106*x*). These various components of the environment 100 can be interconnected, e.g., via a network 108. The network 108 maybe an intranet, the Internet, or any other type of network. The environment 100 can also include other components that are not illustrated.

Figure 2:
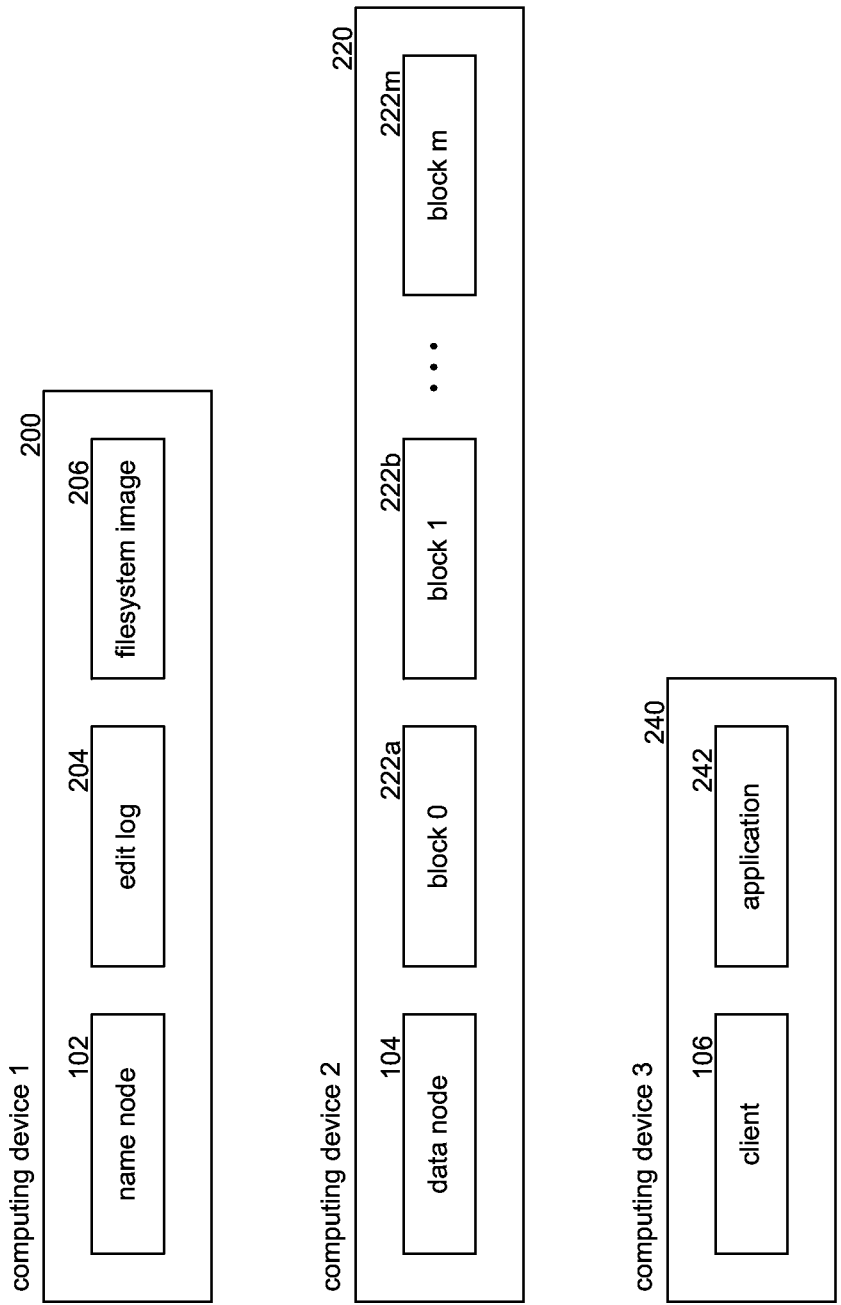
FIG. 2 is a block diagram illustrating components of a large scale data storage service, consistent with various embodiments.

FIG. 2 is a block diagram illustrating components of a large scale data storage service, consistent with various embodiments. The components can include a computing device 1 (200), a computing device 2 (220), and a computing device 3 (240). The computing device 200 may be configured as a name node 102, e.g., by including name node software, an edit log 204, and a file system image 206. The name node software may respond to requests from client computing devices, e.g., to read and/or store data. The edit log 204 may store additions or edits to data, e.g., until the additions and/or edits are "committed" to the database. The file system image 206 may be a description of where the data is stored, e.g., at data nodes. In various embodiments, the name node may include multiple file system images (not illustrated).

The computing device 220 may be configured as a data node 104, e.g., by including data node software, and multiple blocks 222, e.g., block 0 (222*a*), block 1 (222*b*), and block m (222*m*). In various embodiments, the multiple blocks may store data.

The computing device 240 may be configured as a client computing device, e.g., by including an application 242, that is capable of communicating with a name node 102, e.g., via a network 100 (illustrated in FIG. 1).

Figure 3:
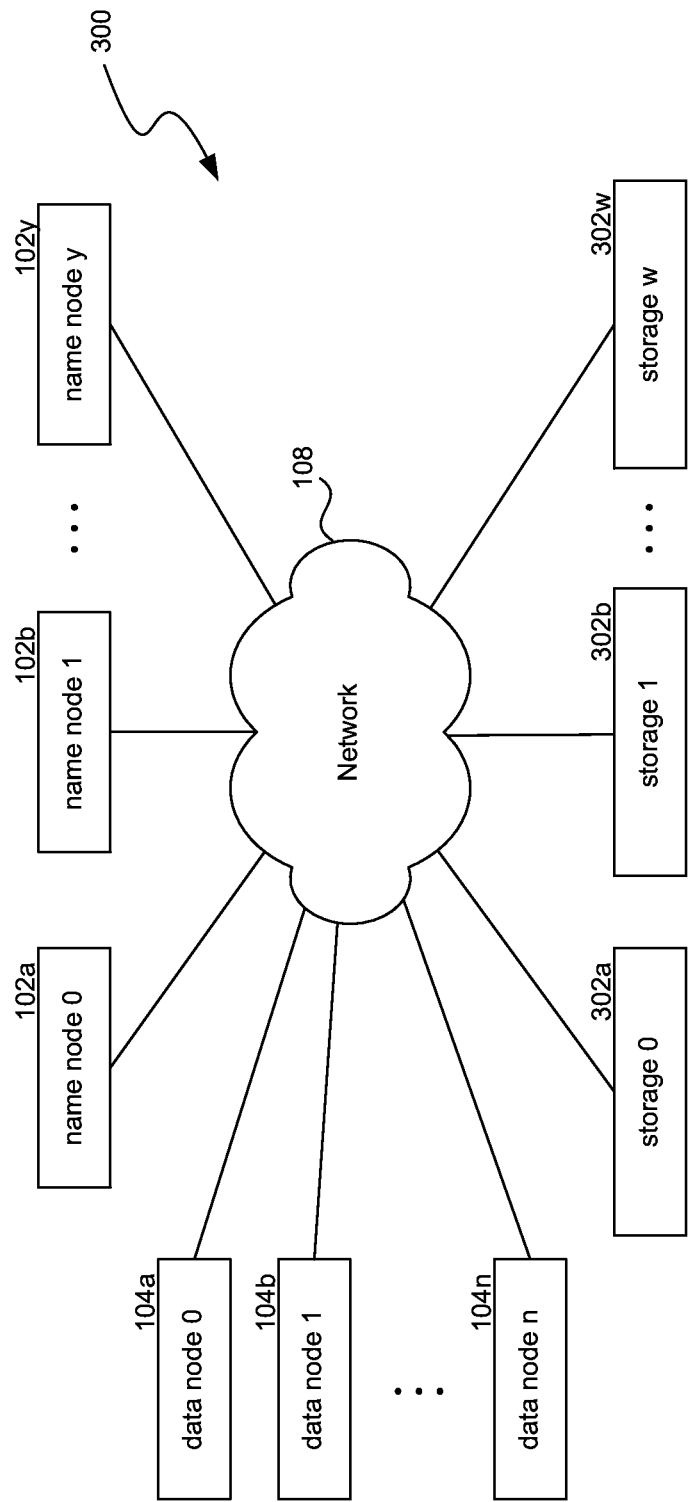
FIG. 3 is a block diagram illustrating an environment in which the disclosed technology may operate in some embodiments.

FIG. 3 is a block diagram illustrating an environment 300 in which the disclosed technology may operate in some embodiments. The environment 300 can include multiple name nodes 102, e.g., 102a, 102b, and 102y. As an example, the environment 300 can include a master name node and other name nodes. One of the multiple name nodes may be selected (e.g., "elected" or otherwise configured) to be the master name node. The master name node may be identified at a well-known location, e.g., a known IP address, socket number, server name, etc. The other name nodes may handle one or more partitions of the namespace, e.g., as identified by a namespace partition table. The environment 300 can also include multiple data nodes 104, e.g., 104a, 104b, and 104n. The name nodes may identify one or more data nodes that store data corresponding to a file path. In various embodiments, the data nodes may store the data at local data store devices (e.g., hard disk drives, solid state drives, etc.) and/or at data storage systems, e.g., at storage server 0 (302a), storage server 1 (302b), and storage server w (302w). Examples of data nodes and storage servers are storage computing devices commercialized by various storage server vendors, e.g., NetApp, Inc.

Figure 4:
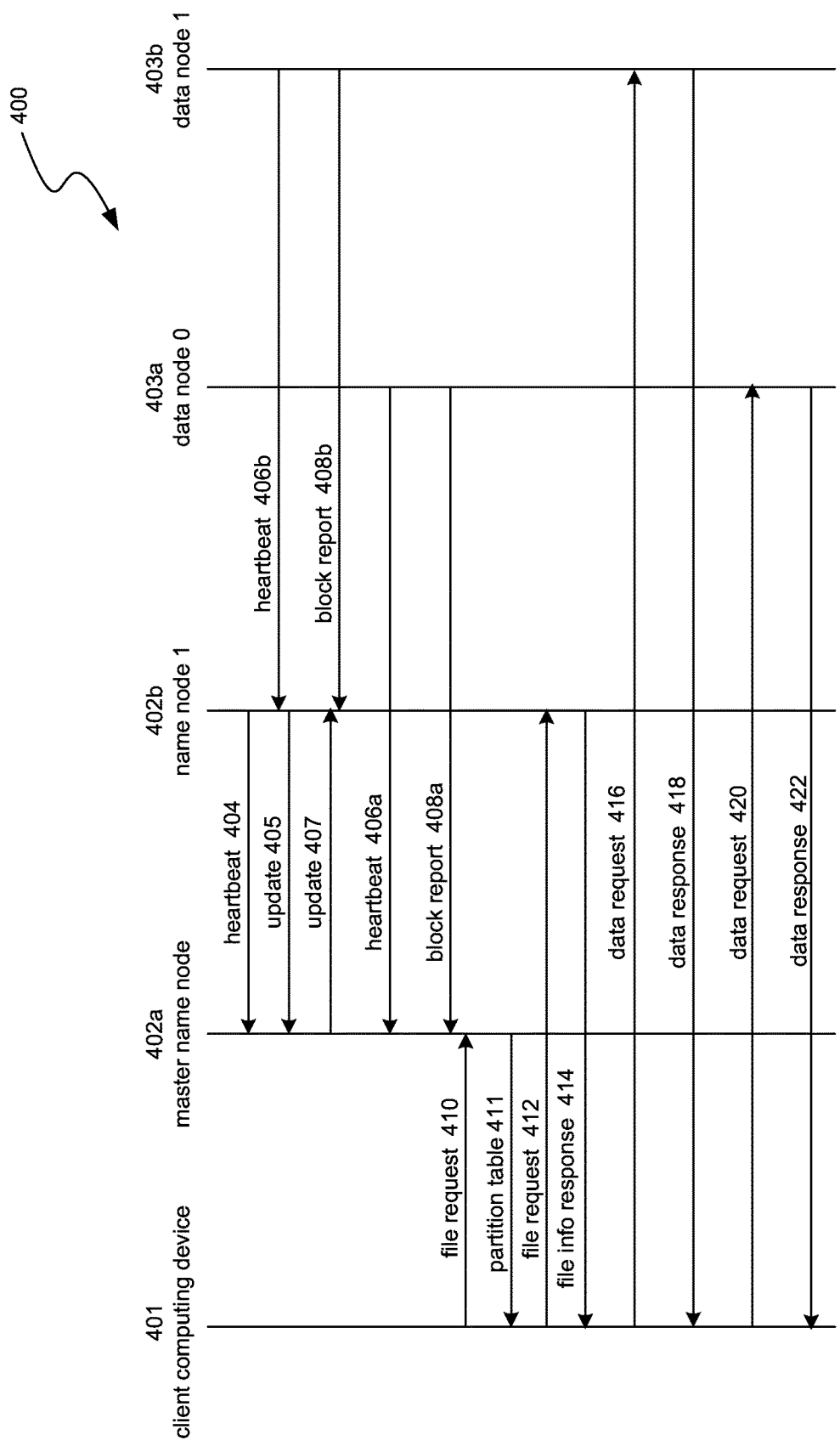
FIG. 4 is a message flow diagram illustrating messages exchanged by various components of the disclosed technology, consistent with various embodiments.

FIG. 4 is a message flow diagram illustrating messages 400 exchanged by various components of the disclosed technology, consistent with various embodiments. The messages 400 can be exchanged via various components of the environment 300, e.g., a client computing device 401, a master name node 402a, a second name node 402b, a first data node 403a, and a second data node 403b. The master name node 402a may receive heartbeat messages 404 from other name nodes, e.g., the second name node 402b. The heartbeat messages 404 may be received at various times, e.g., on a periodic basis, and may indicate not only that the sending name node is presently functional, but may also include various data, e.g., status, throughput, utilization, network status, data node status, etc. Name nodes may also receive heartbeat messages from data nodes with which the name nodes are connected. As examples, the second name node 402b may receive heartbeat messages 406b from the second data node 403b and the master name node 402a may receive heartbeat messages 406a from the first data node 403a. The heartbeat messages 406a and 406b may be received at various times, e.g., on a periodic basis, and may indicate not only that the sending data nodes are presently functional, but may also include various data, e.g., status, throughput, available data storage capacity, utilization, network status, storage server status, data storage device status, etc. Thus, the technology can employ the heartbeat messages 404, 406a, and 406b to determine the current "health" of the system and take remediation measures, if needed. As an example, if the second name node 402b is unable to transmit the heartbeat messages 404 to the master name node 402a, the second name node 402b may initiate a process to select a new master node. In various embodiments, in addition to or instead of heartbeat messages between name nodes (e.g., heartbeat 404), the technology may employ inter-name node communications, e.g., update 405 and update 407. The inter-name node communications can serve additional heartbeat functions. As an example inter-name node communications can be used for directory operations (e.g., to hash a directory's file path and its constituent files to disparate partitions), filesystem operations, load balancing, failure detection, and failure recovery.

Name nodes may sometimes receive block reports from data nodes with which they are connected. As examples, the master name node 402a and the second name node 402b receive block reports 408a and 408b from the first data node 403a and the second data node 403b, respectively. In various embodiments, the block reports can indicate which blocks are being used, which blocks are free, correspondences between blocks and file paths, hash values associated with the blocks, etc. The data nodes may transmit the block reports at various times, e.g., as a part of heartbeat messages, in response to data requests, or at other times.

Upon receiving an initial file request 410 from a client computing device 401, the master name node 402a may respond by transmitting 411 a partition table. The partition table is described in further detail below in relation to FIG. 8. In various embodiments, the master name node 402a may also satisfy the file request 410. In various embodiments, upon receiving the partition table, the client computing device 401 may determine from the partition table that the second name node 402b is presently configured to satisfy the file request and may transmit 412 the file request to the second name node 402b. In various embodiments, the second name node 402b may satisfy the file request. In various embodiments, the second name node 402b may respond to the file request by returning 414 a file information response message. The file information response message may indicate one or more data nodes and the blocks they store that would satisfy the file request. The client computing device may then send data requests 416 and 420 to the indicated data nodes 403a and 403b, respectively, and receive in response data responses 418 and 422. The data responses may include the data that was originally requested by the client computing device 401.

Figure 5A:
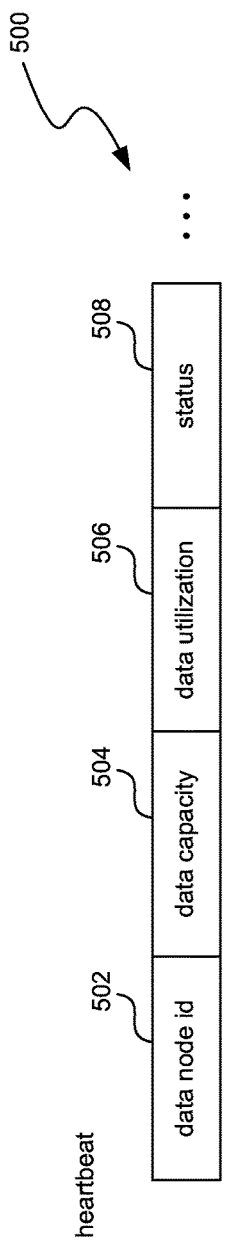
FIGS. 5A-5C are block diagrams illustrating portions of various messages exchanged by components of the disclosed technology, consistent with various embodiments.
Figure 5B:
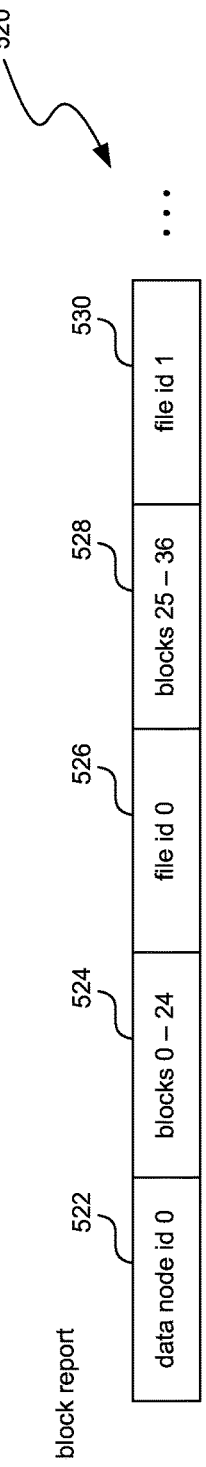
Figure 5C:
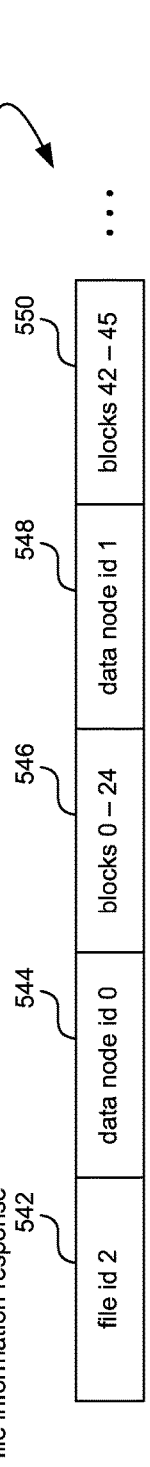

FIGS. 5A-5C are block diagrams illustrating portions of various messages exchanged by components of the disclosed technology, consistent with various embodiments. FIG. 5A is a block diagram illustrating portions of a heartbeat message 500. The heartbeat message 500 can correspond to the heartbeat message that a data node transmits to a name node. The heartbeat message 500 can include a data node identifier field 502, a data capacity field 504, a data utilization field 506, and a status field 508. The data node identifier field 502 can identify the data node that transmitted the heartbeat message 500, e.g., by using an IP number, server name, etc. The data capacity and utilization fields 504 and 506, respectively, can indicate how much storage space exists, how much is used, how it is used (e.g., compacted, encrypted, etc.), and so forth.

FIG. 5B is a block diagram illustrating portions of a block report message 520. The block report message 520 can include a data node identifier field 522, block identifier fields (e.g., 524 and 528), and file identifier fields (e.g., 526 and 530). The data node identifier field 522 can identify the data node that transmitted the block report message 520, e.g., by using an IP number, server name, etc. The block identifier fields and file identifier fields can together identify correspondences between blocks in storage and files. As an example, "file id 0" is stored at blocks 0-24, and "file id 1" is stored at block 25-36. In various embodiments, the file identifiers may be stored as file paths, hash values, etc.

FIG. 5C is a block diagram illustrating portions of a file information response message 540. The file information response message 540 may be transmitted by a name node to a client computing device, e.g., in response to a message requesting data. The file information response message 540 can include a file identifier field 542, and pairs of data node identifier and block identifier fields, e.g., 544 and 546; 548 and 550; etc. In some embodiments, after a client computing device receives a file information response message 540, the client computing device can request data from the indicated data nodes, e.g., by specifying the indicated data blocks. In some embodiments, the file information response message may contain data node identifiers and the client computing devices may merely indicate the file paths or hash values to request data.

Figure 6:
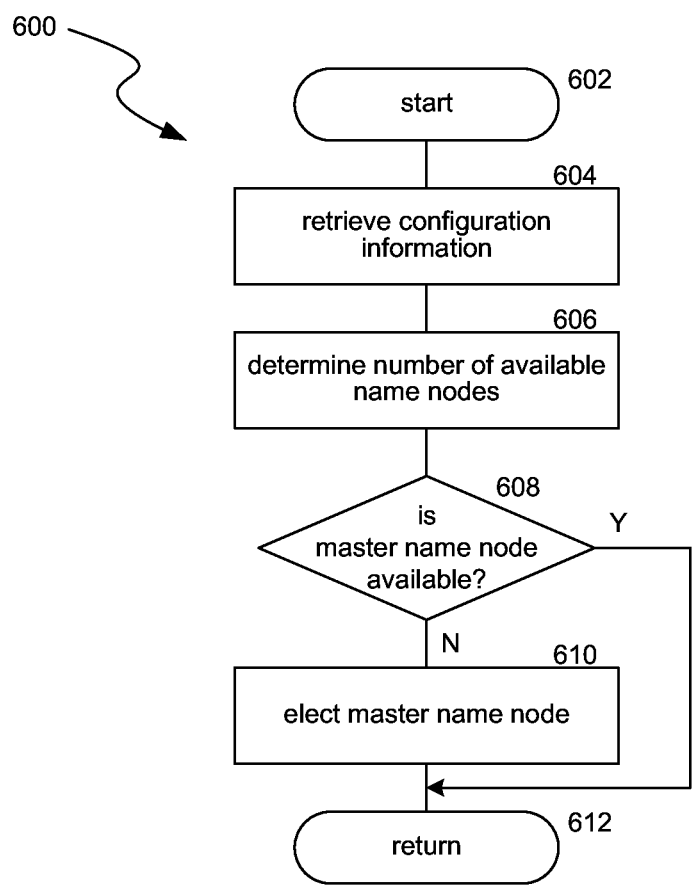
FIG. 6 is a flow diagram illustrating a routine for selecting a master name node, consistent with various embodiments.

FIG. 6 is a flow diagram illustrating a routine 600 for selecting a master name node, consistent with various embodiments. The routine 600 begins at block 602. At block 604, the routine 600 retrieves configuration information. The configuration information can provide various information, e.g., name nodes, data nodes, connections, etc. At block 606, the routine 600 determines the number of available name nodes, e.g., based on the retrieved configuration information. At decision block 608, the routine 600 determines whether a master name node is available. If a master name node is available, the routine 600 returns at block 612. Otherwise, the routine 600 continues at block 610, where it elects a master name node. As an example, a first name node to determine that the master name node is unavailable may broadcast to all the other name nodes a message that it is to become the master name node. If it is indeed the first name node to broadcast such a message, it may be identified to be the master name node. The routine 600 then returns at block 612.

Those skilled in the art will appreciate that the logic illustrated in FIG. 6 and described above, and in each of the flow diagrams discussed below, may be altered in a variety of ways. For example, the order of the logic may be rearranged, substeps may be performed in parallel, illustrated logic may be omitted, other logic may be included, etc.

Figure 7:
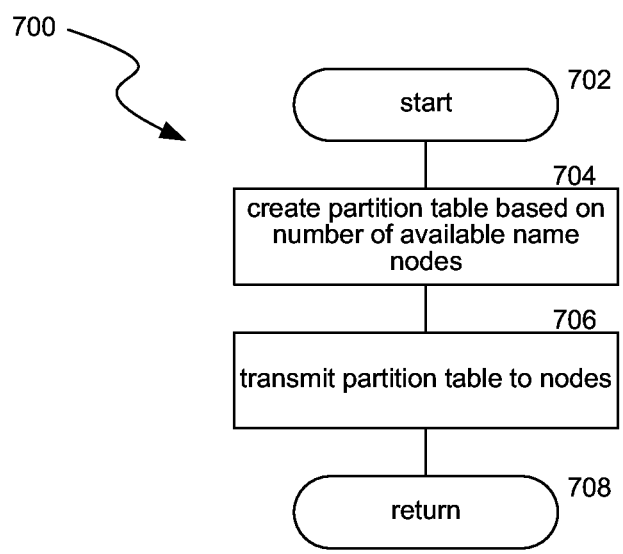
FIG. 7 is a flow diagram illustrating a routine for creating and distributing a partition table, consistent with various embodiments.

FIG. 7 is a flow diagram illustrating a routine 700 for creating and distributing a partition table, consistent with various embodiments. The routine 700 begins at block 702. At block 704, the routine 700 creates a partition table based on the number of available name nodes, e.g., as indicated in the configuration information described above in relation to FIG. 6. At block 706, the routine 700 transmits the created partition table to all the other name nodes. The routine then returns at block 708. In various embodiments, the routine may also transmit the created partition table to other computing devices.

FIG. 8 is a table diagram illustrating a partition table 800, consistent with various embodiments. The partition table 800 can indicate a hash value range 802 that specifies a partition and a name node 804 that handles the specified partition. The partition can be specified as beginning at a first hash value 806 and ending at a second hash value 808. As an example, a first partition 810 begins at a hash value 0000 and ends at hash value 3FFF, a second partition 812 begins at hash value 4000 and ends at hash value 7FFF, a third partition 814 begins at hash value 8000 and ends at hash value BFFF and a fourth partition 816 begins at hash value C000 and ends at hash value FFFF (hash values in hexadecimal). In general, partitions may have substantially equal size, but various sizes may be specified, e.g., based on compute or storage capacities or other limitations. In various embodiments, the name node identifiers (column 804) can be specified as IP numbers, server names, etc.

While FIG. 8 illustrates a table whose contents and organization are designed to make them more comprehensible by a human reader, those skilled in the art will appreciate that actual data structures used by the facility to store this information may differ from the table shown, in that they, for example, may be organized in a different manner, may contain more or less information than shown, may be compressed and/or encrypted, etc.

Figure 9:
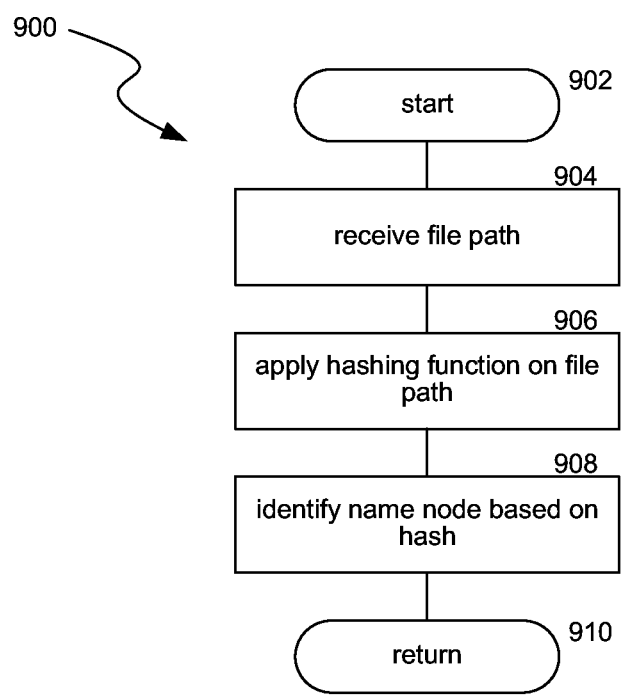
FIG. 9 is a flow diagram illustrating a routine for identifying a name node based on a file path, consistent with various embodiments.

FIG. 9 is a flow diagram illustrating a routine 900 for identifying a name node based on a file path, consistent with various embodiments. The routine 900 begins at block 902. At block 904, the routine 900 receives a file path. The file path may be specified, e.g., as a location of a directory, a location of a file, etc., using a uniform resource locator ("URL"), server message block ("SMB") path, etc. At block 906, the routine 900 applies a hashing function on the received file path. A hash function is an algorithm that maps data of arbitrary length to data of a fixed length. The values returned by a hash function are called hash values. As an example, the technology may use a hashing function that maps file paths to 32-bit values. In various embodiments, the hash values may be evenly distributed across the namespace. There are various known techniques for generating hash values, and the technology may be capable of operating with any or all such known techniques. At block 908, the routine 900 may identify a name node based on the hash value. At block 910, the routine returns, and can provide the identified name node. In various embodiments, the routine 900 may be used in lieu of a partition table, e.g., when initially determining where to transmit file requests.

Figure 10:
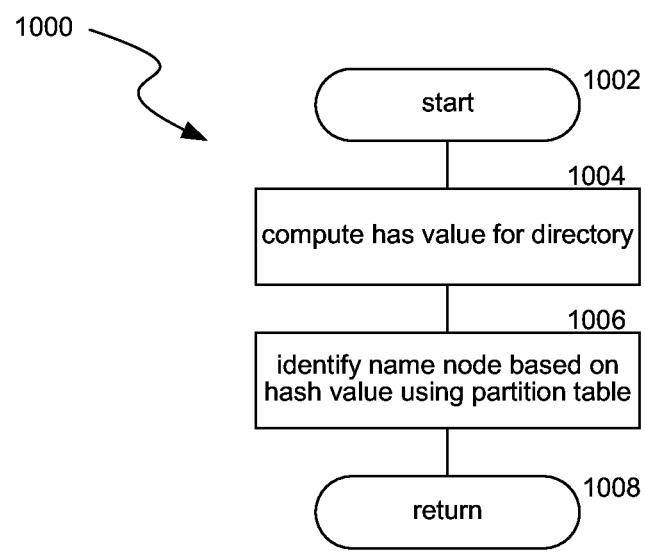
FIG. 10 is a flow diagram illustrating a routine for identifying a name node using a partition table, consistent with various embodiments.

FIG. 10 is a flow diagram illustrating a routine 1000 for identifying a name node using a partition table, consistent with various embodiments. The routine 1000 begins at block 1002. At block 1003, the routine 1000 receives a file path. At block 1004, the routine 1000 computes a hash value based on the received file path. At block 1006, the routine 1000 identifies a name node, e.g., by looking up the hash value in a partition table. The routine 1000 returns at block 1008 and can provide the identified name node.

Figure 11:
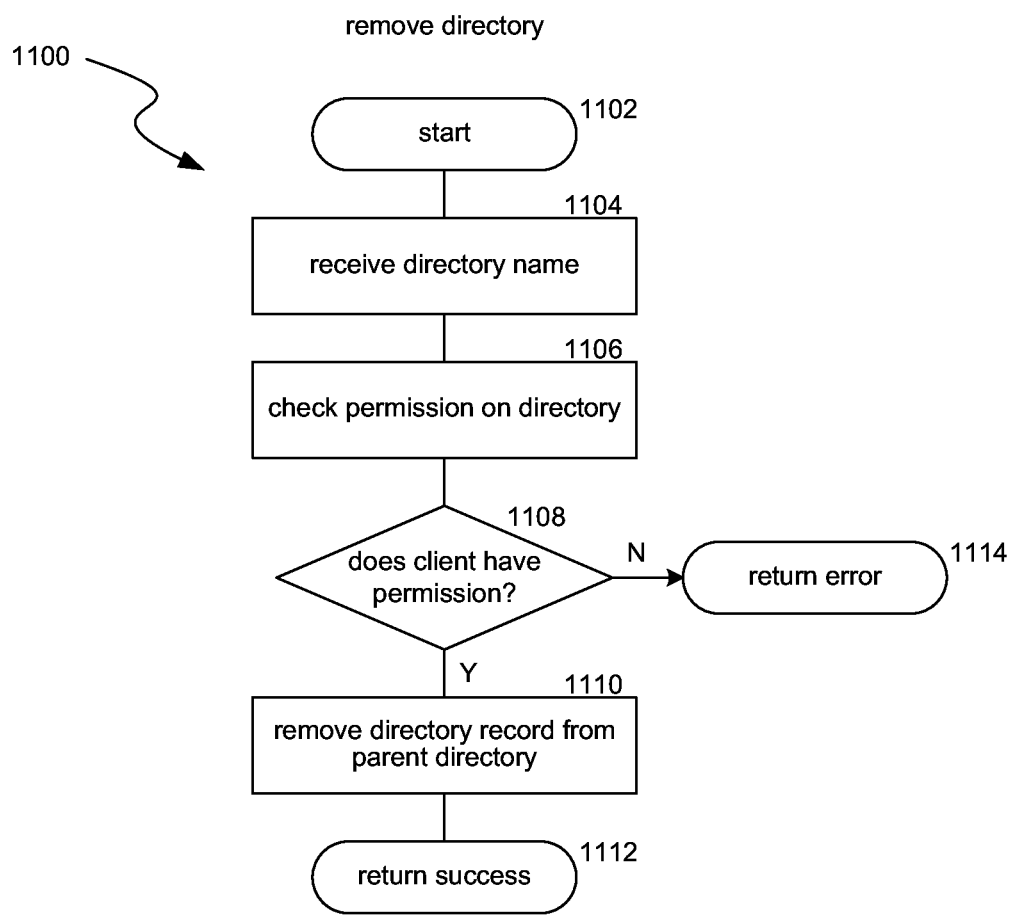
FIG. 11 is a flow diagram illustrating a routine for removing a directory, consistent with various embodiments.

FIG. 11 is a flow diagram illustrating a routine 1100 for removing a directory, consistent with various embodiments. The routine 1100 begins at block 1102. At block 1104, the routine 1100 receives a directory name. At block 1106, the routine 1100 checks permissions on the directory, e.g., using an access control list or other security mechanism. At decision block 1108, the routine 1100 determines whether the client has sufficient permissions to remove the identified directory. If the client does not have permissions, the routine 1100 returns an error at block 1114. However, if the client has sufficient permissions, the routine 1100 continues at block 1110. At block 1110, the routine 1100 removes the directory record corresponding to the directory to be removed from a parent directory. The routine 1100 indicates success and returns at block 1112.

Figure 12:
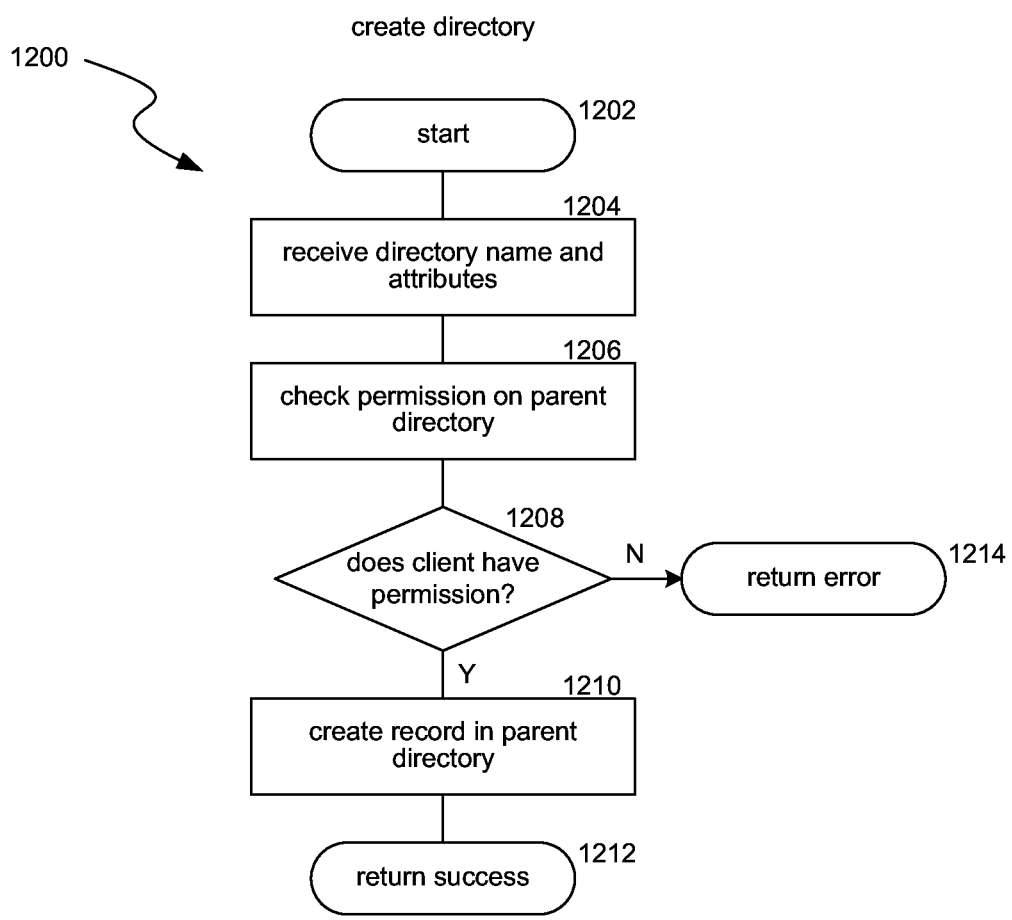
FIG. 12 is a flow diagram illustrating a routine for creating a directory, consistent with various embodiments.

FIG. 12 is a flow diagram illustrating a routine 1200 for creating a directory, consistent with various embodiments. The routine 1200 begins at block 1202. At block 1204, the routine 1200 receives a directory name and attributes, e.g., a name for the new directory, security tributes, etc. At block 1206, the routine 1200 checks permissions on a parent directory for the directory that was requested to be created. At decision block 1208, the routine 1200 determines whether the client has sufficient permissions to create the directory. If the client does not have sufficient permissions, the routine 1200 returns an error at block 1214. If, however, the client has sufficient permissions, the routine 1200 continues at block 1210, where it creates a record in the parent directly. The routine 1200 then returns an indication of success at block 1212.

Figure 13:
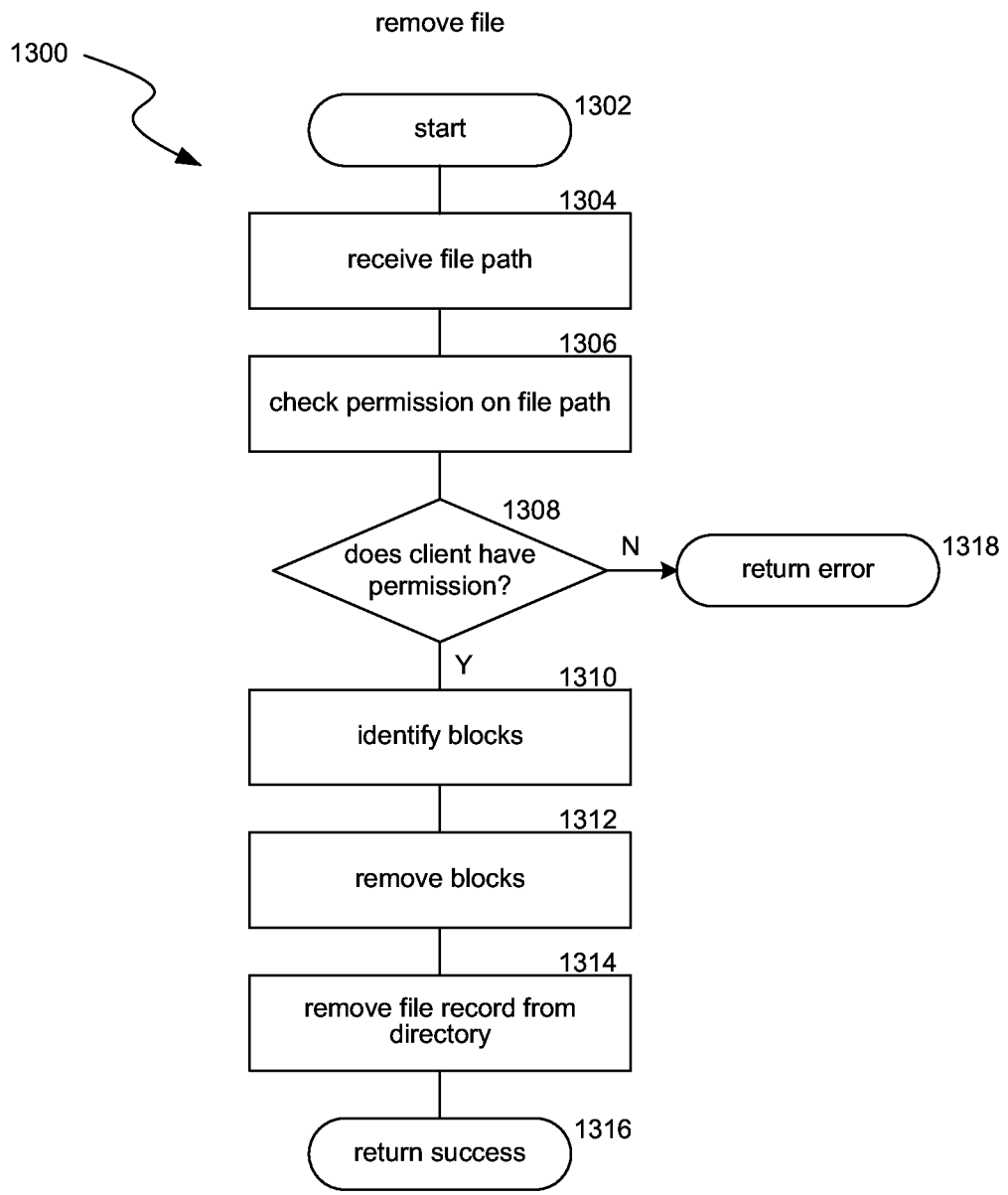
FIG. 13 is a flow diagram illustrating a routine for removing a file, consistent with various embodiments.

FIG. 13 is a flow diagram illustrating a routine 1300 for removing a file, consistent with various embodiments. The routine 1300 begins a block 1302. At block 1304, the routine 1300 receives a file path. At block 1306, the routine 1300 determines whether the client has sufficient permissions to remove the file located at the specified file path. At decision block 1308, if the client has sufficient permissions, the routine 1300 continues at block 1310. Otherwise, the routine 1300 returns an error at block 1318. At block 1310, the routine 1300 identifies blocks associated with the file to be removed. At block 1312, the routine 1300 indicates that the identified blocks have been removed, e.g., by setting values in a block allocation table, file allocation table, or other indicator of associations between blocks and files. At block 1314, the routine 1300 removes the record corresponding to the file from the directory. At block 1316, the routine 1300 returns an indication of success.

Figure 14:
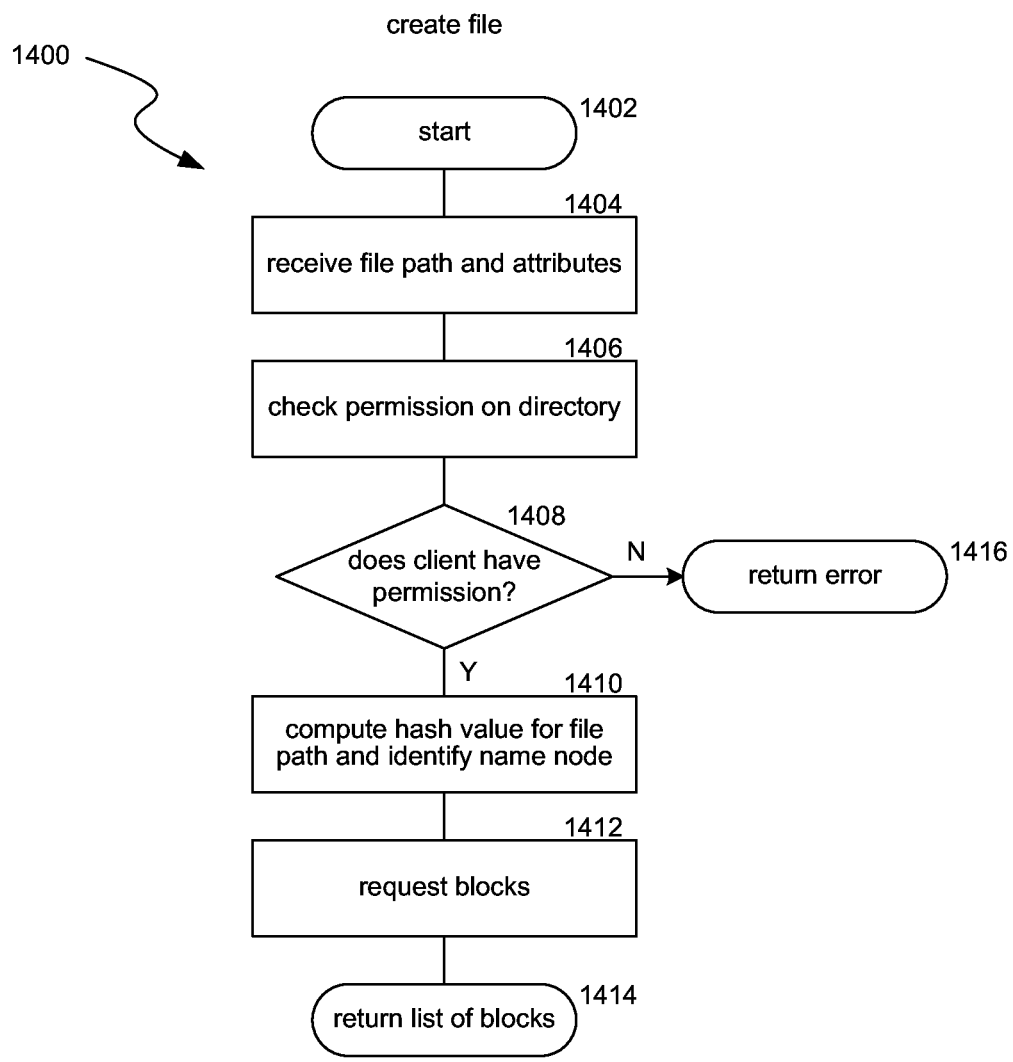
FIG. 14 is a flow diagram illustrating a routine for creating a file, consistent with various embodiments.

FIG. 14 is a flow diagram illustrating a routine 1400 for creating a file, consistent with various embodiments. The routine 1400 begins a block 1402. At block 1404, the routine 1400 receives a file path and associated attributes, e.g., file name, file size, security attributes, etc. At block 1406, the routine 1400 determines whether the client has sufficient permissions to create the file. If at decision block 1408 the client has sufficient permissions, the routine 1400 continues at block 1410. Otherwise, the routine returns an error at block 1416. At block 1410, the routine 1400 computes a hash value for the file path and identifies, e.g., based on the computed hash value, a name node. At block 1412, the routine requests blocks, e.g., a sufficient number of blocks for the file to be created. At block 1414, the routine returns a list of the assigned blocks.

Figure 15:
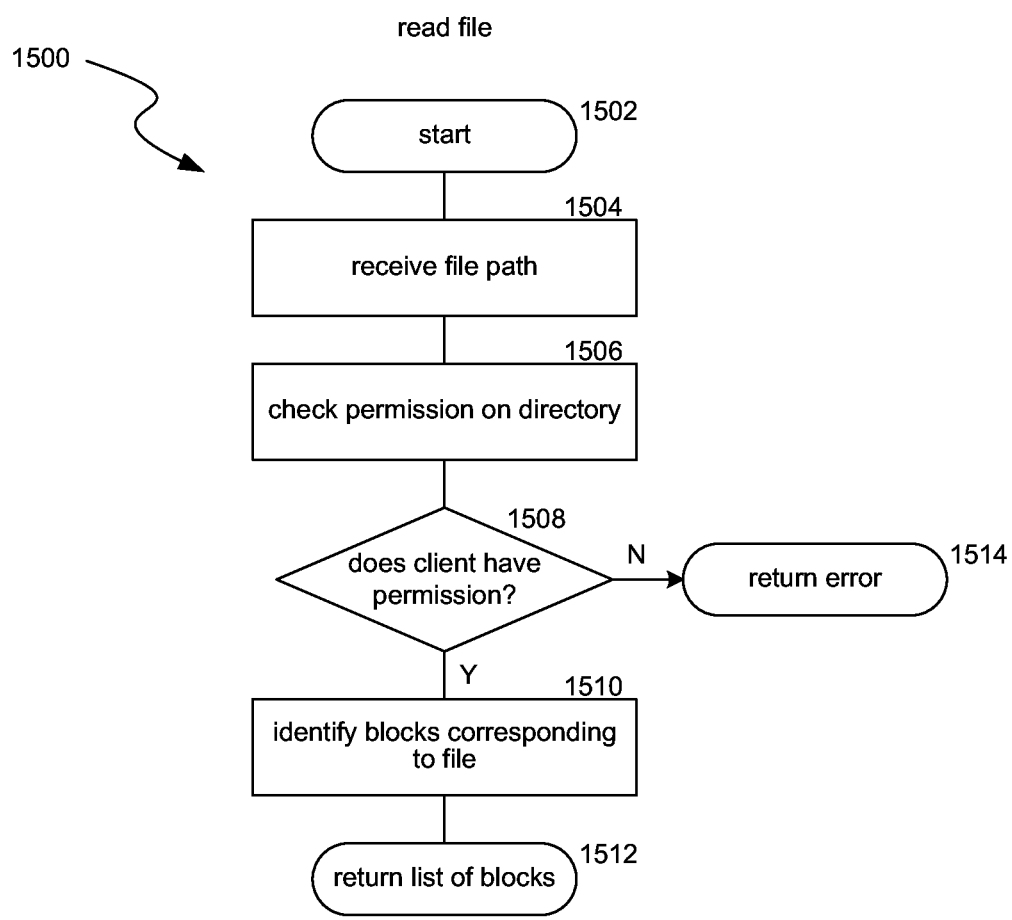
FIG. 15 is a flow diagram illustrating a routine for reading a file, consistent with various embodiments.

FIG. 15 is a flow diagram illustrating a routine 1500 for reading a file, consistent with various embodiments. The routine 1500 begins at block 1502. At block 1504, the routine 1500 receives a file path. At block 1506, the routine 1500 determines whether the client has sufficient permissions to read the file. At decision block 1508, if the client has sufficient permissions, the routine 1500 continues at block 1510. Otherwise, the routine 1500 returns an error at block 1514. At lot 1510, the routine identifies blocks corresponding to the received file path. At block 1512, the routine 1500 returns the list of identified blocks.

Figure 16:
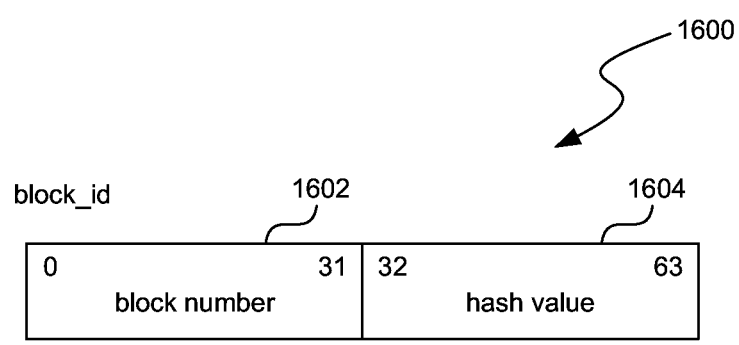
FIG. 16 is a block diagram illustrating portions of a block identifier, consistent with various embodiments.

FIG. 16 is a block diagram illustrating portions of a block identifier 1600, consistent with various embodiments. The block identifier 1600 can be provided in a block report, stored at a data node, or otherwise used to indicate associations between blocks and hash values. In various embodiments, a block identifier 1600 is assigned a 64-bit value, with 32 bits identifying a block number 1602 and the remaining 32 bits identifying a hash value 1604 corresponding to a file path with which the block is associated. Thus, for example, a database that indexes on the stored hash values would be able to quickly identify blocks associated with a particular hash value (and corresponding file path).

In various embodiments a method performed by a computing device for partitioning a namespace of a large scale data storage service is disclosed, comprising: receiving a file path; employing a hashing function to produce a hash value for the received file path; and identifying a name node handling the produced hash value, wherein the name node is configured to communicate with one or more data nodes for handling file requests on the file path. The method can produce a partition table identifying associations between hash values and name nodes. The method can transmit the produced partition table in response to receiving a message from a client computing device. The produced partition table can be transmitted to a second name node other than a primary name node that produced the partition table. In the event that the name node that produced the partition table is unavailable, the second name node can become the primary name node. The primary name node can be identified at a well-known network address so that client computing devices can transmit initial file requests to the primary name node. The name node can be identified in a message exchanged using a protocol layer employed by the LSDS service.

In various embodiments, a system is disclosed, comprising: a master name node component configured to receive a file request, produce a partition table, and transmit the produced partition table, wherein the partition table identifies at least a second name node component so that recipients of the produced partition table can identify, based on a file path, to which of the at least two name node components to transmit file requests; and one or more data node components connected to the at least two name node components, wherein the data node components are configured to respond to data requests corresponding to the file requests. The partition table can identify correspondences between hash values and name nodes. When one of the name nodes has failed, a portion of the namespace previously in the partition of the failed name node can be reassigned to a different name node. The failed name node can be identified by its failure to transmit heartbeat messages. The portion of the namespace previously in the partition of the failed name node can be apportioned to other name nodes. The namespace can be identified as a range of integer values. The namespace can be identified by a 32-bit value. The namespace can be identified by producing a hash value based on a file path. The data nodes may identify blocks using a block identifier. The block identifier can be encoded with a hash value. The hash value can correspond to a hash function applied to a file path, wherein a block identified by the block value is assigned to the file path.

In various embodiments, a computer-readable storage device storing instructions is disclosed, comprising instructions for receiving a file path; instructions for employing a hashing function to produce a hash value for the received file path; and instructions for identifying a name node handling the produced hash value, wherein the name node is configured to communicate with one or more data nodes for handling file requests on the file path. The computer-readable storage device can further comprise instructions for producing a partition table identifying associations between hash values and name nodes.

In various embodiments, a method is disclosed for employing subpartitions of a partitioned namespace of a large scale data storage service, comprising: creating at least two subpartitions from a partitioned namespace, wherein the partitioned namespace corresponds to at least two different name nodes of the LSDS service; and storing data corresponding to each subpartition as a separate file. The method can further comprise determining that a first name node of the at least two different name nodes is no longer available; identifying subpartitions previously handled by the first name node; selecting a second name node of the at least two different name nodes; and causing the second name node to begin handling at least a subset of the identified subpartitions. The method can mount a separate file corresponding to at least one of the subpartitions of the subset of partitions. The method can further comprise mounting the separate file as a file system. The method can further comprise storing the separate file at a storage server that is accessible by multiple name nodes. The method can further comprise storing the separate file at a storage server that is accessible by multiple data nodes.

In various embodiments, a computer-readable storage device is disclosed for storing computer-executable instructions, comprising: instructions for creating at least two subpartitions from a partitioned namespace, wherein the partitioned namespace corresponds to at least two different data nodes of the LSDS service; and instructions for storing data corresponding to each subpartition as a separate file. The instructions can further comprise determining that a first data node of the at least two different data nodes is no longer available; identifying subpartitions previously handled by the first data node; selecting a second data node of the at least two different data nodes; and causing the second data node to begin handling at least a subset of the identified subpartitions. The instructions can further comprise mounting a separate file corresponding to at least one of the subpartitions of the subset of partitions. The instructions can further comprise mounting the separate file as a file system. The instructions can further comprise storing the separate files at a storage server that is accessible by multiple data nodes. The instructions can further comprise storing the separate files at a storage server that is accessible by multiple data nodes.

In various embodiments, a system is disclosed, comprising a first name node and a second name node, wherein the name nodes are configured to receive a file path and identify where in a set of data nodes data corresponding to the file path is stored, wherein each name node has a partition of a namespace corresponding to a set of possible hash values; and two or more files, each file corresponding to a subpartition of the partition of the namespace and configured to be mounted as a file system. When a name node is no longer available, a different one of the name nodes can mount as a file system a file previously handled by the name node that is no longer available. The files can be mounted by data nodes and when it is determined that a data node is no longer available, a different one of the data nodes mounts as a file system a file previously handled by the data node that is no longer available. Contents of a heartbeat message can indicate that the data node is no longer available. The contents can indicate bandwidth, throughput, or utilization. The data node can be determined to be no longer available after a specified time period lapses without having received a heartbeat message. The file system can be a Hadoop file system. The system can further comprise a storage server reachable via a network by name nodes and data nodes, wherein the storage server stores at least a subset of the two or more files in a redundant, highly available manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method, comprising:
   creating a plurality of subpartitions from a partitioned namespace of a large scale data storage (LSDS) service, wherein the partitioned namespace corresponds to at least two different name nodes of the LSDS service;
   creating a partition table assigning subpartitions of the plurality of subpartions among the at least two different name nodes, wherein the partition table designates a first name node of the at least two different name nodes to handle at least two of the subpartitions;
   indicating, by a range of hash values in the partition table, one or more file paths corresponding to the first name node, wherein the first name node is configured to communicate with one or more data nodes to handle file requests corresponding to the one or more file paths, and
   storing data corresponding to each subpartition of the subpartitions as a separate file.

2. The method of claim 1, further comprising:
   determining that the first name node of the at least two different name nodes is no longer available;
   identifying subpartitions previously handled by the first name node;
   selecting a second name node of the at least two different name nodes; and
   causing the second name node to begin handling at least a subset of the identified subpartitions.

3. The method of claim 2, further comprising mounting a separate file corresponding to at least one of the subpartitions of the subset of partitions.

4. The method of claim 1, further comprising mounting the separate file as a filesystem.

5. The method of claim 1, further comprising storing the separate files at a storage server that is accessible by multiple name nodes.

6. The method of claim 1, further comprising storing the separate files at a storage server that is accessible by multiple data nodes.

7. A non-transitory machine readable medium having stored thereon instructions for performing a method comprising machine executable code which when executed by at least one machine, causes the machine to:
   create a plurality of subpartitions from a partitioned namespace of a large scale data storage (LSDS) service, wherein the partitioned namespace corresponds to at least two different name nodes of the LSDS service;
   create a partition table assigning subpartitions of the plurality of subpartitions among the at least two different name nodes;
   configure, wherein the partition table such that a first name node of the at least two different name nodes services data transactions directed to at least two of the subpartitions;
   indicate, by a range of hash values in the partition table, one or more file paths corresponding to the first name node, wherein the first name node is configured to communicate with one or more data nodes to handle file requests corresponding to the one or more file paths; and
   store data corresponding to each subpartition of the subpartitions as a separate file.

8. The non-transitory machine readable medium of claim 7, further comprising machine executable code that causes the machine to:
   determine that the first name node of the at least two different name nodes is no longer available;
   identify subpartitions previously handled by the first name node;
   select a second name node of the at least two different name nodes; and
   cause the second name node to begin handling at least a subset of the identified subpartitions.

9. The non-transitory machine readable medium-of claim 8, further comprising instructions for mounting a separate file corresponding to at least one of the subpartitions of the subset of partitions.

10. The non-transitory machine readable medium of claim 7, further comprising machine executable code that causes the machine to mount the separate file as a filesystem.

11. The non-transitory machine readable medium of claim 7, further comprising machine executable code that causes the machine to store the separate files at a storage server that is accessible by multiple data nodes.

12. A computing device comprising:
a memory containing machine readable medium comprising machine executable code having stored thereon instructions for performing a method of managing at least one namespace; and
a processor coupled to the memory, the processor configured to execute the machine executable code to cause the processor to:
create a partition table dividing a namespace among a plurality of name nodes, wherein the partition table further divides the namespace into a plurality of subpartitions, and wherein the partition table designates a first name node of the plurality of name nodes to service data transactions directed to at least two subpartitions of the plurality of subpartitions;
indicate, by a range of hash values in the partition table, one or more file paths corresponding to the first name node, wherein the first name node is configured to communicate with one or more data nodes to handle file requests corresponding to the one or more file paths; and
store data associated with the namespace such that data corresponding to each subpartition is stored as a separate file.

13. The computing device of claim 12, wherein the processor is further configured to execute the machine executable code to designate one of the plurality of name nodes as a master name node, and wherein the master name node is designated to provide the partition table in response to a data transaction.

14. The computing device of claim 12, wherein the processor is further configured to execute the machine executable code to reassign a first subpartition of the at least two subpartitions from the first name node to a second name node of the plurality of name nodes upon determining that the first name node is not responding.

15. The computing device of claim 14, wherein the processor is further configured to execute the machine executable code to reassign a second subpartition of the at least two subpartitions from the first name node to a third name node of the plurality of name nodes upon determining that the first name node is not available.

16. The computing device of claim 14, wherein the processor is further configured to execute the machine executable code to determine that the first name node is not available based on an attribute of a heartbeat message, and wherein the attribute includes a period of time elapsing without receiving the heartbeat message.

17. The computing device of claim 16, wherein the attribute includes at least one selected from the group consisting of: bandwidth, throughput, and utilization.

18. The computing device of claim 12, wherein the processor is further configured to execute the machine executable code to store each file of the at least two subpartitions in a redundant manner.

19. The computing device of claim 12, wherein the processor is further configured to execute the machine executable code to mount at least one file of the at least two subpartitions as a filesystem.

20. The computing device of claim 19, wherein the filesystem is a Hadoop filesystem.

* * * * *